US007814984B1

United States Patent
Fraley et al.

(10) Patent No.: US 7,814,984 B1
(45) Date of Patent: Oct. 19, 2010

(54) TILLER APPARATUS AND METHOD

(75) Inventors: J. Phillip Fraley, Winfield, AL (US); John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 0 days.

(21) Appl. No.: 12/569,681

(22) Filed: Sep. 29, 2009

Related U.S. Application Data

(63) Continuation-in-part of application No. 29/334,247, filed on Mar. 23, 2009, now Pat. No. Des. 607,017.

(60) Provisional application No. 61/222,666, filed on Jul. 2, 2009.

(51) Int. Cl.
 *A01B 9/00* (2006.01)
 *A01B 51/00* (2006.01)
(52) U.S. Cl. .......................... 172/35; 172/107
(58) Field of Classification Search ........... 37/249–261, 37/231, 232, 196, 209–224; 172/35, 36, 172/49, 57, 60, 100, 107–123; 56/328.1, 56/329, 16.7, 16.9; 74/11, 15.6, 355, 377, 74/532, 551, 849
See application file for complete search history.

(56) References Cited

U.S. PATENT DOCUMENTS

| 3,892,278 | A | * | 7/1975 | Smith et al. | 172/70 |
| 4,402,366 | A | * | 9/1983 | Dankel | 172/43 |
| 4,421,177 | A | * | 12/1983 | Schlapman et al. | 172/63 |
| 4,512,414 | A | * | 4/1985 | Kuhn et al. | 172/112 |
| 4,620,599 | A | * | 11/1986 | Zinck | 172/42 |
| 5,101,911 | A | * | 4/1992 | Lee et al. | 172/48 |
| 5,520,253 | A | * | 5/1996 | Kesting | 172/125 |
| 5,765,646 | A | * | 6/1998 | Kim | 172/35 |

* cited by examiner

*Primary Examiner*—Robert E Pezzuto
(74) *Attorney, Agent, or Firm*—Angela Holt; Lanier Ford Shaver & Payne P.C.

(57) ABSTRACT

A tiller with a removable tine rotor is provided. The tiller comprises a cavity formed by a top deck and end plates. The end plates comprise rotating spindles rotatably attached to the end plates. A gearbox translates rotation from a tractor to one of the rotating spindles. A tine rotor extends between the spindles and rotates to till soil. The tine rotor is releasably connected to the spindles within the cavity, such that the tine rotor is removable from the tiller without disassembly of the end plates.

11 Claims, 7 Drawing Sheets

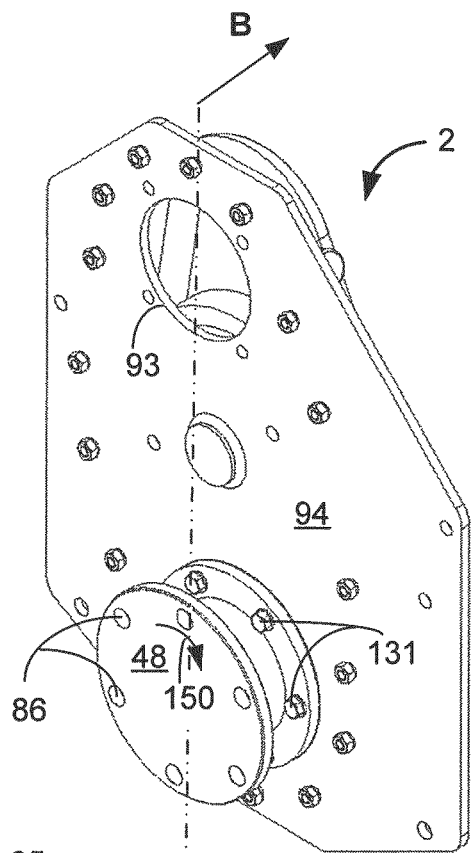
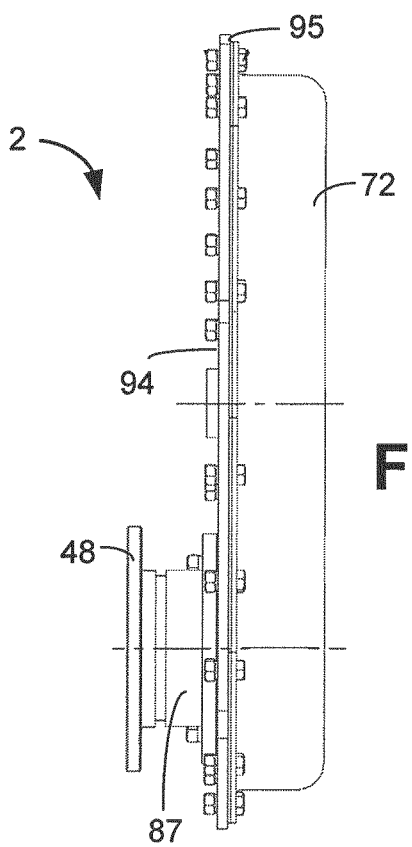
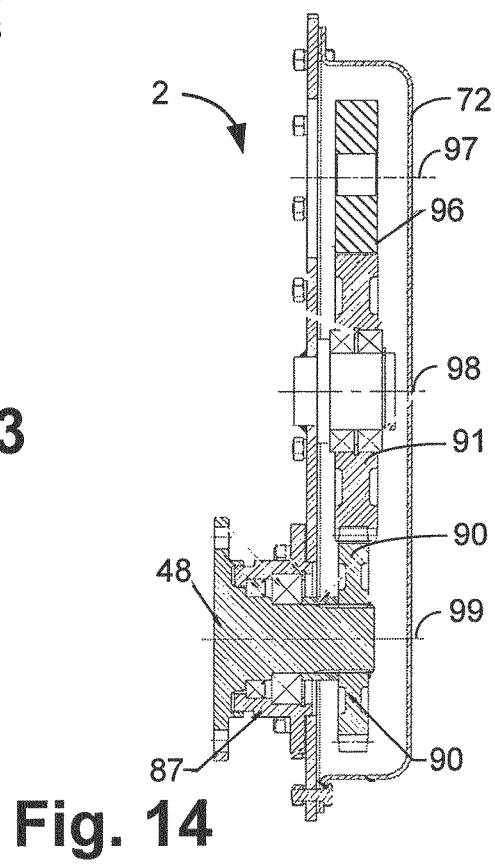
Fig. 12
Fig. 13
Fig. 14

TILLER APPARATUS AND METHOD

REFERENCE TO RELATED APPLICATIONS

This application is a continuation-in-part of and claims priority to U.S. Design patent application Ser. No. 29/334,247, filed Mar. 23, 2009, titled "Tiller," which is incorporated herein by reference. This application further claims priority to U.S. Provisional Patent Application Ser. No. 61/222,666, filed Jul. 2, 2009, titled "Implement Support Stand," which is incorporated herein by reference.

FIELD OF THE INVENTION

The present invention relates generally to the field of tractor-based, rotary-driven power equipment, and more particularly relates to a tiller.

BACKGROUND AND SUMMARY OF THE INVENTION

Tillers utilize a tine rotor comprising tines that till soil when the tine rotor rotates. In prior art tillers, when the tine rotor needs to be removed for replacement or maintenance, the user must generally remove the gears and side of the tiller in order to free the tine rotor. This operation is necessarily labor and time intensive.

The tiller according to the present disclosure has a tine rotor that is removable from the tiller with minimal disassembly of the tiller. The tiller comprises a frame with a top side and plates extending downwardly at the ends of the top side. The top side and the plates form a cavity within which the tine rotor is disposed.

A series of gears on the gear end of the tiller translates rotational motion from the tractor to the tine rotor. The tine rotor comprises end discs on each end, and the end discs releasably connect to rotating spindles extending within the cavity from the end plates.

In order to remove the tine rotor from the tiller, a user removes fasteners that connect the end discs to the rotating spindles and removes the tine rotor by pulling it straight out from the tiller. The user does not have to remove the gears or the gear end of the tiller in order to remove the tine rotor.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 12 is a side perspective view of a gear end of the tiller of FIG. 1.

FIG. 13 is a side plan view of the gear end of FIG. 12.

FIG. 14 is a cross-sectional view of the gear end of FIG. 12, taken along section lines B-B of FIG. 12.

DETAILED DESCRIPTION

Figures 1, 2:
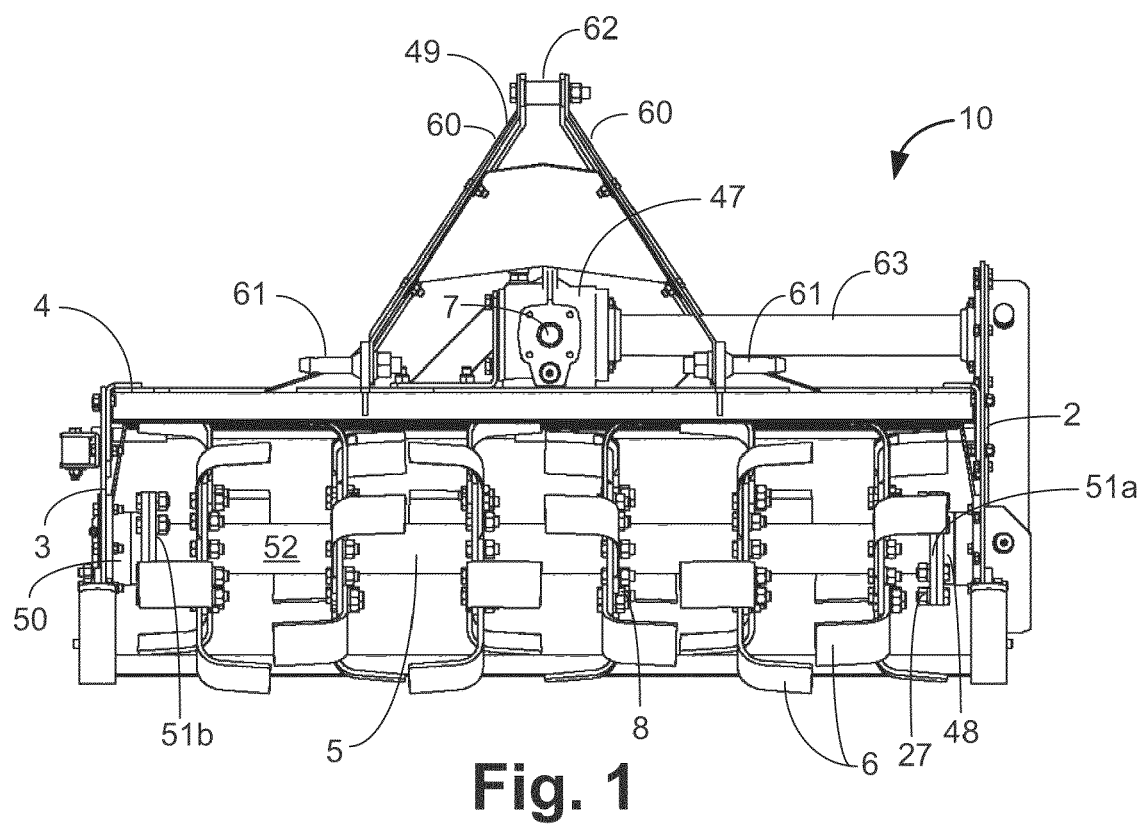
FIG. 1 is a front plan view of an exemplary tiller according to an embodiment of the present disclosure.
FIG. 2 is a front perspective view of the tiller of FIG. 1.

FIG. 1 depicts a tiller 10 according to an exemplary embodiment of the present disclosure. In operation, the tiller 10 is connected to a tractor (not shown) that supports the tiller and provides rotation to operate the tiller 10, as further discussed below.

The tiller 10 comprises a tine rotor 5. The tine rotor 5 comprises a generally cylindrical shaft 52 that rotates to till soil (not shown). A plurality of spaced-apart tines 6 are rigidly affixed to the shaft 52 and contact the soil when the tine rotor 5 rotates. In the illustrated embodiment, the tines 6 are affixed via a plurality of fasteners 8 to tine discs (not shown) that are welded to the shaft 52, as further discussed herein.

Figure 3:
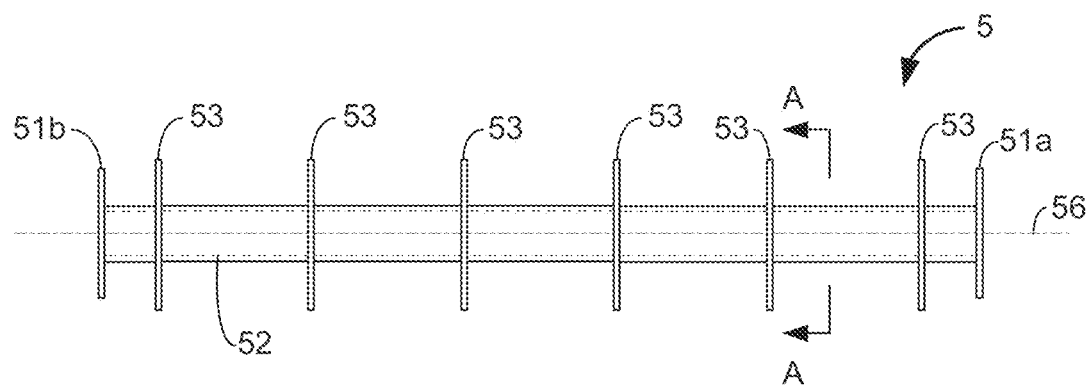
FIG. 3 is a front plan view of the tine rotor of FIG. 2
Figure 5:
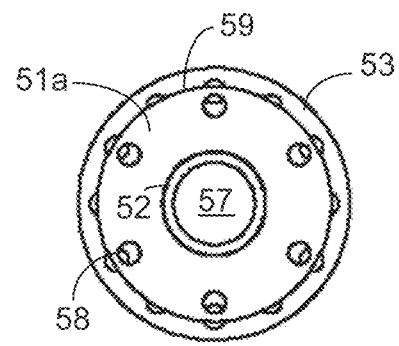
FIG. 5 is an end view of the tine rotor of FIG. 2.

The tine rotor 5 further comprises end discs 51a and 51b rigidly affixed to the ends of the tine rotor 5, as further discussed herein with respect to FIGS. 2, 3 and 5.

The tine rotor 5 rotatably connects to a gear end 2 of the tiller 10 on one end of the tine rotor 5 and to a hub end 3 of the tiller 10 on an opposite end of the tine rotor 5. The gear end 2 comprises a rotatable gear end spindle 48 that is releasably affixed to the end disc 51a of the tine rotor 5, as further discussed herein. The hub end 3 comprises a rotatable hub end spindle 50 that is releasably affixed to the end disc 51b of the tine rotor 5.

The tine rotor 5 thus extends between the gear end spindle 48 and the hub end spindle 50, and rotates when the gear end spindle 48 rotates, as further discussed herein. The gear end spindle 48 and the hub end spindle 50 releasably connect to the end discs 51a and 51b, respectively, of the tine rotor 5 via a plurality of fasteners 27.

The tiller 10 comprises a frame 4 that structurally supports the tiller 10. A lift arm assembly 49 is rigidly affixed to the frame 4 and connects the tiller 10 to the tractor (not shown) via a standard three point hitch (not shown). The lift arm assembly 49 comprises two angled lift arms 60 extending from the frame 4. A spacer pin 62 extends between the lift arms 60.

A gearbox 47 affixed to the frame 4 translates rotational motion from the tractor (not shown) to the tine rotor 5. In this regard, the gearbox 47 comprises a front shaft 7 rotatably connectable to a power take-off (PTO) (not shown) of the tractor (not shown). As is known by persons of skill in the art, a power take-off is a splined driveshaft on a tractor or truck that is used to provide power to an attachment or separate machines. The power take-off provides rotation to the front shaft 7 of the gearbox 47, which imparts rotation to the tine rotor 5 via a gear shaft (not shown) covered by a shaft cover 63 that extends between the gearbox 47 and the gear end 2.

The gear end 2 contains gears (not shown) that translate the rotational motion from the gear shaft to the tine rotor 5, as further discussed herein.

FIG. 2 depicts the tine rotor 5 with the tines 6 (FIG. 1) removed. The tine rotor 5 comprises a generally cylindrical shaft 52 that typically is manufactured from hollow tubing. A plurality of spaced-apart tine discs 53 are rigidly affixed to the shaft 52. The tine discs 53 comprise thin, generally flat and generally round discs with central openings (not shown) for receiving the shaft 55. The tine discs 53 are rigidly affixed to the shaft 52 by welding in one embodiment. However, the tine discs 53 may be attached differently in other embodiments.

Each tine disc 53 comprises a plurality of openings 54 extending through disc to receive fasteners (not shown) for affixing the tines 6 (FIG. 1) to the tine disc 53. The openings 54 of each of the plurality of tine discs 53 are aligned with each other, to ensure uniform placement of the tines 6 (FIG. 1) on the tine rotor 5. The illustrated embodiment depicts six (6) tine discs 53. However, more or fewer tine discs 53 may be used without departing from the scope of the present disclosure.

The two end discs 51a and 51b are rigidly fixed on opposing ends of the shaft 52. The end discs 51a and 51b comprise thin, generally flat and generally round discs with central openings 55 (only one of which is shown in FIG. 2) for receiving the shaft 52. In one embodiment, the end discs 51a and 51b are rigidly affixed to the shaft 52 by welding. However, the end discs 51a and 51b may be attached differently in other embodiments FIG. 3 is a side view of the tine rotor 5 without the tines 6 (FIG. 6) attached. The tine discs 53 are substantially perpendicular to a longitudinal axis 56 of the shaft 52. In operation, the shaft 52 rotates around the longitudinal axis 56. The end discs 51a and 51b are also substantially perpendicular to the longitudinal axis 56. Further, the end discs 51a and 51b are substantially parallel to each other.

Figure 4:
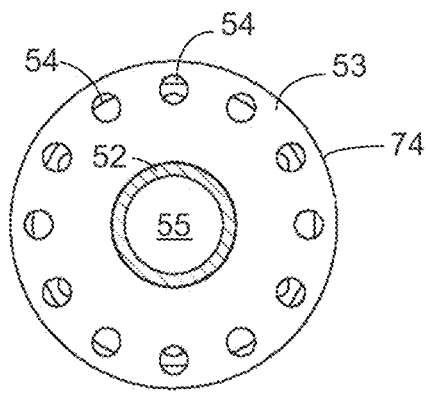
FIG. 4 is a cross-sectional view of a tine disc, taken along section lines A-A of FIG. 3

FIG. 4 is a cross sectional view of the tine rotor 5 of FIG. 3, taken along section lines A-A of FIG. 3. The tine disc 53 comprises a central opening 55 for receiving the shaft 52. The central opening 55 is substantially round and is sized slightly larger than the shaft 52 such that the tine discs 53 may be slid onto the shaft 52 prior to the welding of the tine discs 53 to the shaft 52.

The plurality of openings 54 of the tine disc 53 are located near an outer edge 74 of the tine disc 53, and the plurality of openings 54 are spaced apart equidistant from each other as shown. In the illustrated embodiment, there are twelve (12) openings 54 located in positions substantially similar to the hours on a clock, i.e., spaced 30 degrees apart with respect to the center of the tine disc 53. In other embodiments, other numbers and locations of openings 54 are used.

FIG. 5 is an end view of the tine rotor 5 of FIG. 3. The end disc 51a comprises a central opening 57 for receiving the shaft 52. The central opening 57 is substantially round and is sized slightly larger than the shaft 52 such that the end disc 51a may be slid onto the shaft 52 prior to welding of the end disc 51a to the shaft 52

The end disc 51a further comprises a plurality of openings 58 for receiving fasteners (not shown) that releasably affix the tine rotor 5 to the tiller 10. The illustrated embodiment comprises six (6) openings 58, though more or fewer openings are employed on other embodiments. The openings 58 are located near an outside edge 59 of the end disc 51a and are spaced equidistant from one another, as shown. Although FIG. 5 depicts the end disc 51a on the tine rotor 5, the end disc 51b is substantially similar to the end disc 51a.

Figure 6:
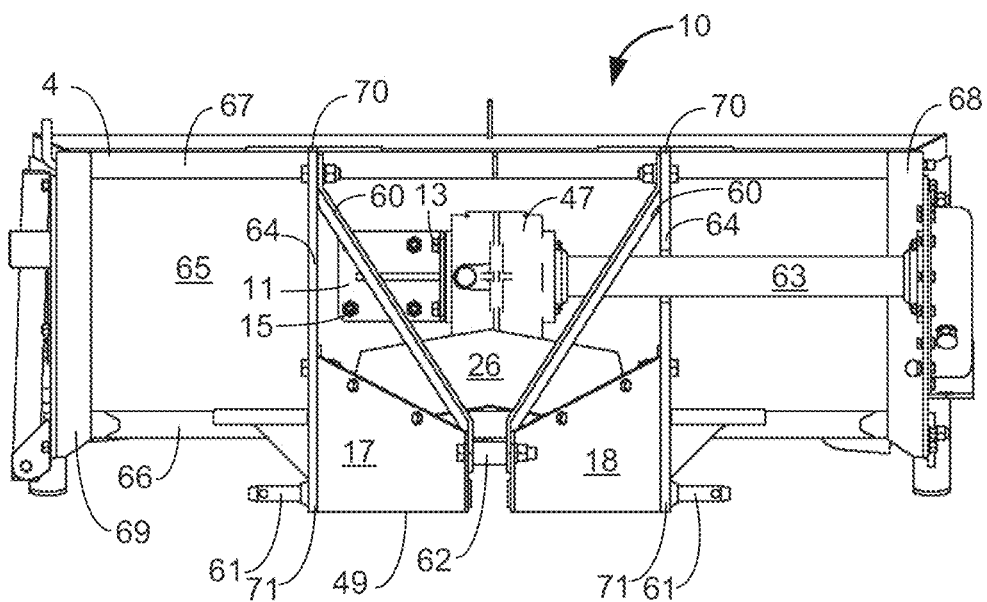
FIG. 6 is a top plan view of the tiller of FIG. 1.

FIG. 6 is a top view of the tiller 10 of FIG. 1. The frame 4 comprises a generally horizontal generally rectangular deck 65 which is a thin sheet of sheet metal in one embodiment. The deck 65 is supported by a front edge support 66, a rear edge support 67, a gear end support 68, and a hub end support 69. The front and rear edge supports 66 and 67 comprise generally flat supports rigidly affixed to the front and rear edges of the deck 65. The gear end support 68 and the hub end support 69 comprise angled sheet metal rigidly affixed to the side edges of the deck 65.

The lift frame 49 comprises two horizontal lift support arms 64 extending from the rear edge support 67 to the front edge support 66 and spaced inside of the gear end support 68 and the hub end support 69. The horizontal lift support arms 64 are rigidly affixed to the deck 65.

The lift arms 60 are rigidly affixed to rear ends 70 of the horizontal lift support arms 64 and extend at an angle upwardly and toward the front of the tiller 10. Two (2) lift pins 61 extend outwardly from front ends 71 of the horizontal lift support arms 64. The lift pins 61 are received by openings (not shown) on the horizontal lift support arms 64. The lift pins 61 are connectable to the tractor, as further discussed herein.

Lift arm supports 17 and 18 extend upwardly and inwardly from the horizontal lift support arms 64 as shown. A center shield 26 extends from the lift arm support 18 to the lift arm support 17 as shown.

The gearbox 47 is affixed to the deck 65 via a gearbox mount 11. The gearbox mount 11 comprises a generally L-shaped angle bracket in which a vertical portion of the mount 11 is affixed to the gearbox with fasteners 13 and a horizontal portion of the mount 11 is affixed to the gearbox with fasteners 15.

Figure 7:
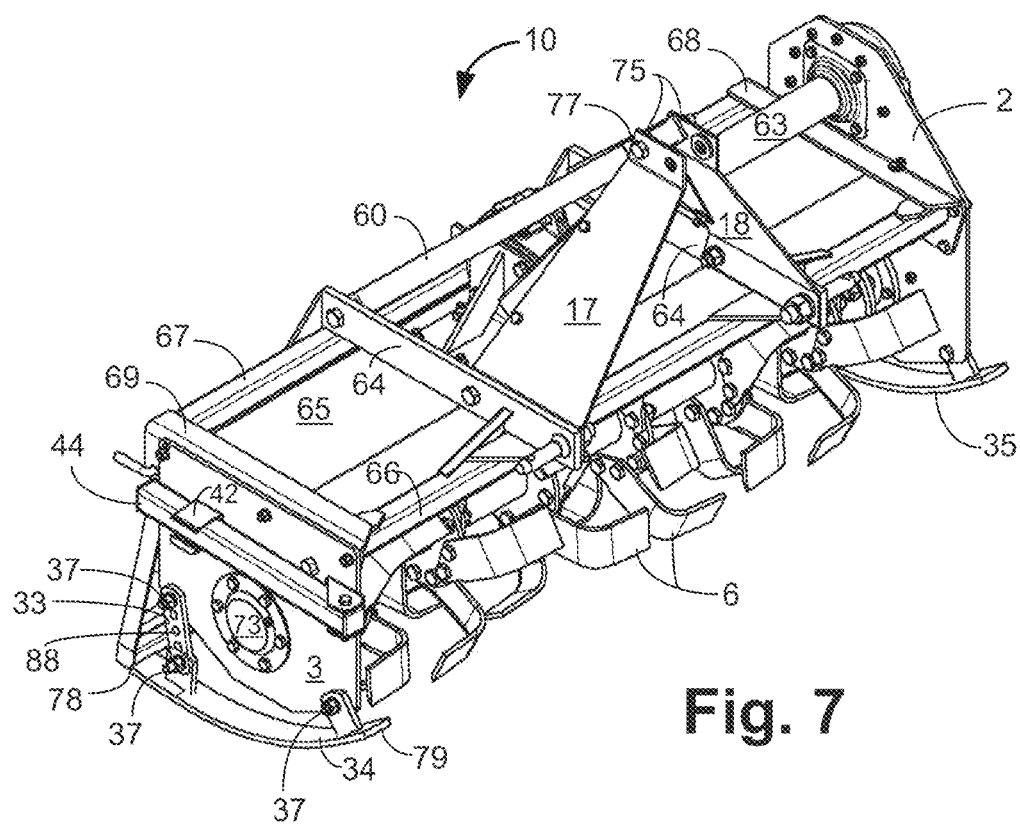
FIG. 7 is a top perspective view of the tiller of FIG. 1.

FIG. 7 is a front perspective view of the tiller 10 of FIG. 1. The angled lift arms 60 (only one of which is shown in FIG. 7), extend upwardly at an angle from the horizontal lift support arms 64 to free ends 75 of the lift arm supports 17 and 18. The angled lift arms 60 are affixed to the lift arm supports 17 and 18 via fastener 77.

A hub end skid 34 and a gear end skid 35 are disposed on opposite lower ends of the tiller 10 as shown. The skids 34 and 35 comprise generally thin bent strips of metal in one embodiment. The skits 34 and 35 contact the ground at a rear edge 78, and curve upwardly at a leading edge 79. In normal operation, the tiller 10 is supported by the skids 34 and 35 and also by the tractor (not shown), the tractor's support being provided via the standard three-point hitch (not shown).

The skids 34 and 35 are affixed to the hub end 3 and the gear end 2, respectively, via fasteners 37. A skid adjuster bar 33 extends between a lower rear edge of the hub end 3 and the skid 34. The skid adjuster bar 33 comprises a plurality of openings 88 that allow a user (not shown) to adjust the distance between the rear edge 78 of the skid 34 and the hub end 3. A substantially similar adjuster bar 33 extends between the skid 35 and the gear end 2, as shown in FIG. 8.

A support stand 44 is rotatably affixed to the hub end 3 of the tiller 10. The support stand 44 extends and rotates to support the tiller 10 when the tiller 10 is not supported by the tractor. When not in use, the support stand 44 is in a stowed position as shown, and is restrained against the hub end 3 by a bracket 42.

The gear end 2 of the tiller 10 connects to the gear end support 68 as shown. An upper portion of the gear end 2 extends above the gear end support 68 such that the shaft cover 63 connects to the gear end 2. The hub end 3 of the tiller 10 connects to the hub end support 69 as shown.

Figure 8:
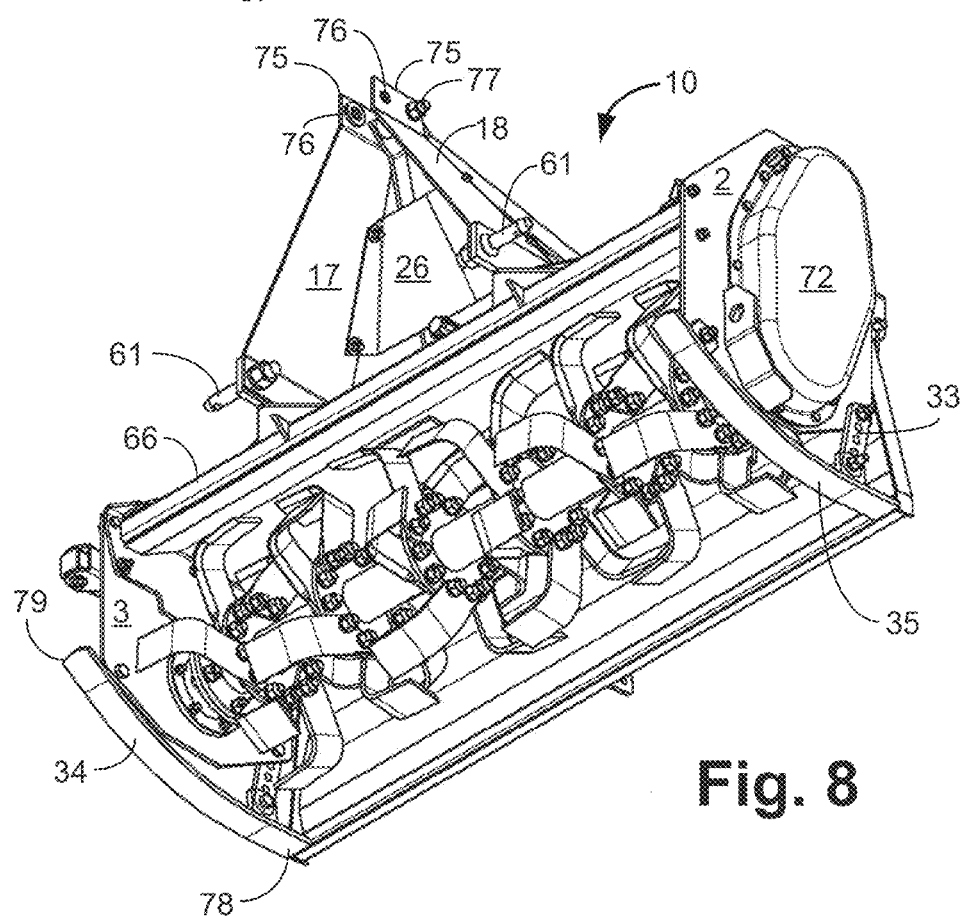
FIG. 8 is a bottom perspective view of the tiller of FIG. 1.

FIG. 8 is a bottom perspective view of the tiller 10 of FIG. 1. The free ends 75 of the lift arm supports 17 and 18 comprise openings 76 near their forward ends. The openings 76 receive a center lift pin (not shown), which extends between the lift arm supports 17 and 18. The center lift pin comprises one of three structural connection points connecting the tiller 10 to the tractor's three point hitch (not shown). In this regard, the lift pins 61 and the center lift pin 62 connect to the three point hitch of the tractor.

The skid adjuster bar 33 extends between the skid 35 and the gear end 2 as discussed above with respect to skid 34 and FIG. 7. A gear cover 72 covers the gears (not shown) in the gear end 2 and is removably affixed to the gear end 2.

Figure 9:
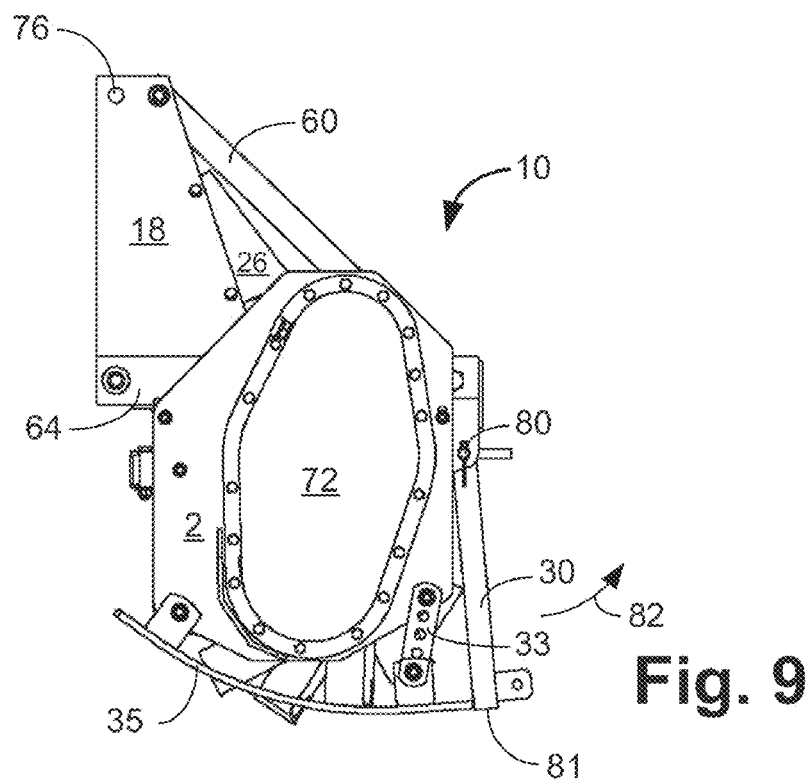
FIG. 9 is an end view of the tiller of FIG. 1.

FIG. 9 is an end view of the tiller 10 of FIG. 1, showing the gear end 2 of the tiller 10. The gear cover 72 covers the gears (not shown). The gear cover 72 is removable by the user (not shown) to enable the user to access the gears for maintenance and/or repair.

Figure 11:
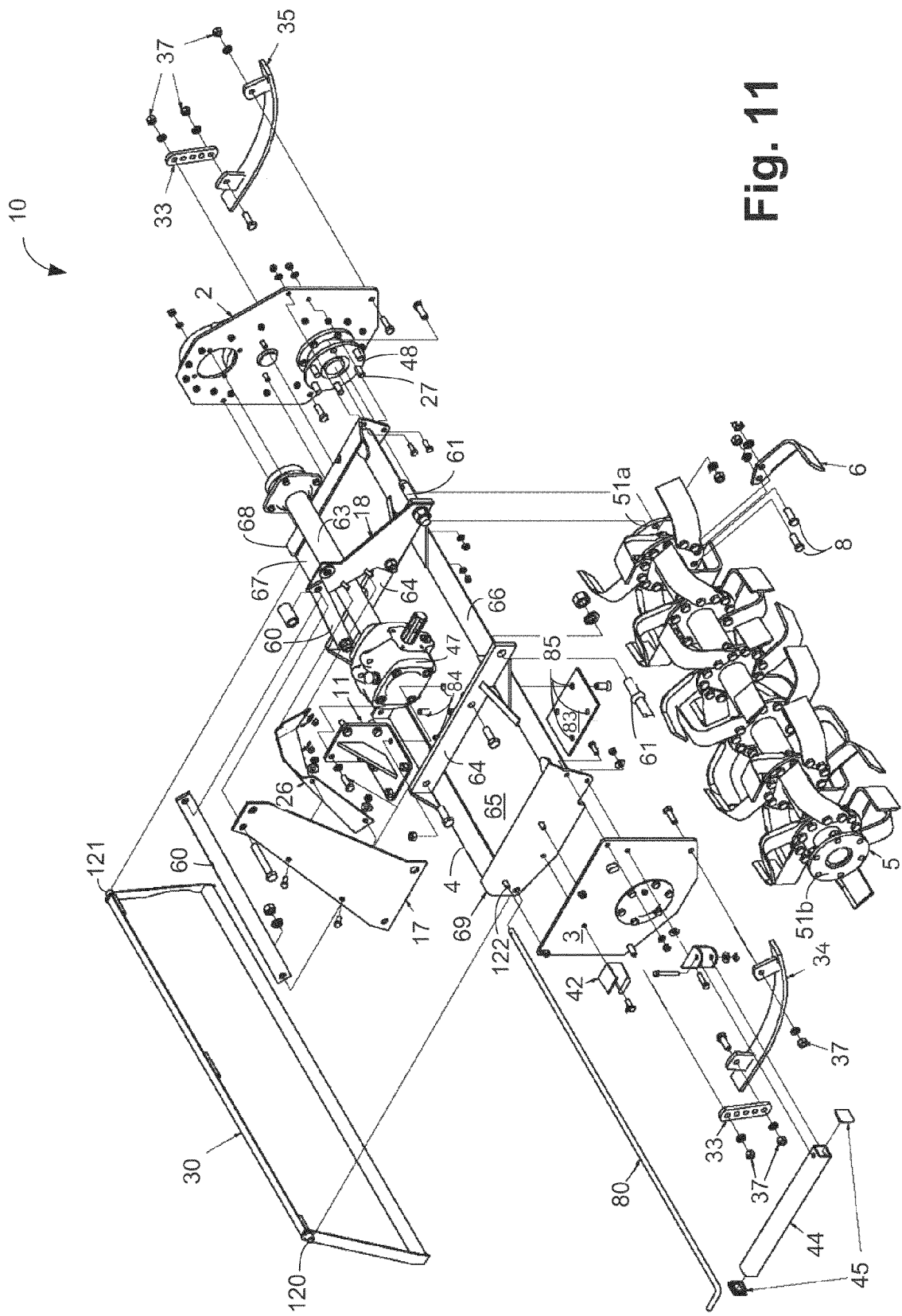
FIG. 11 is an exploded view of the tiller of FIG. 1.

A back plate 30 is rotatably affixed to the rear edge support 67. In one embodiment, the back plate 30 comprises a thin sheet of metal with bent edges (as illustrated in FIG. 11). The back plate 30 rotates around a hinge 80 which rotatably secures the back plate 30 to the tiller 10. A bottom edge 81 of the back plate 30 is free, thus the back plate is rotatable in the direction indicated by directional arrow 82.

Figure 10:
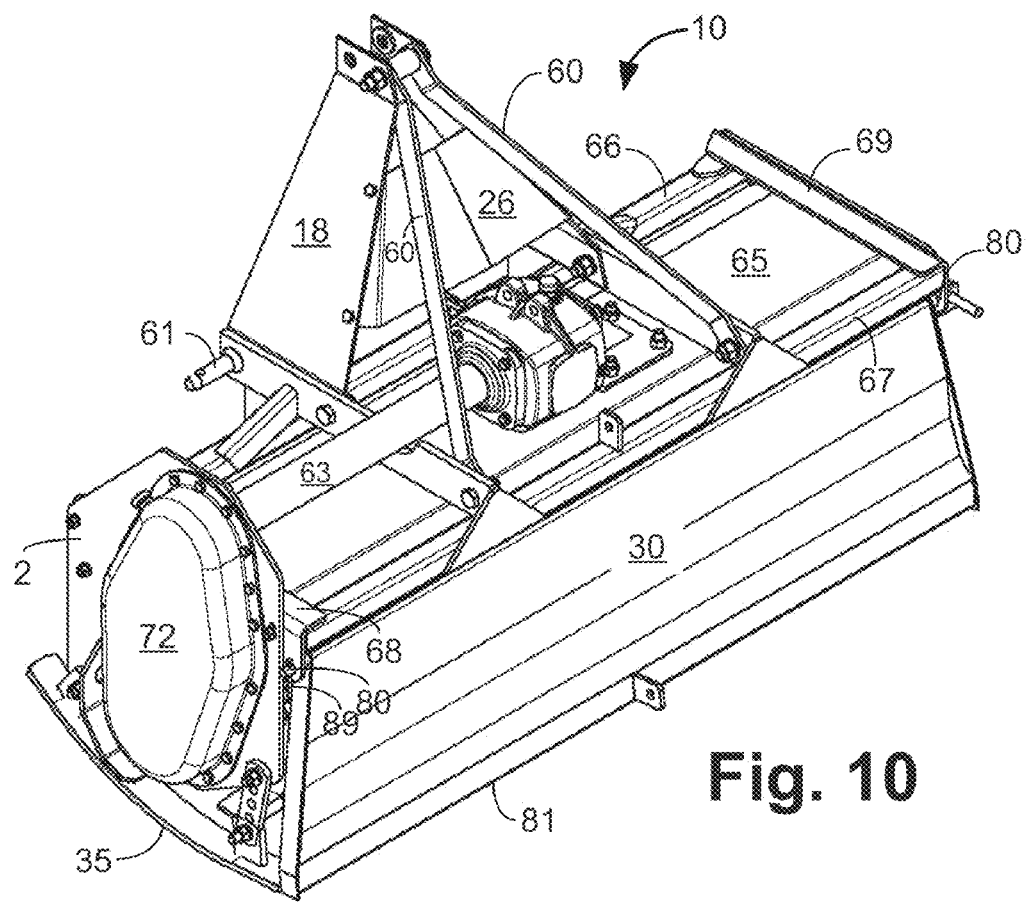
FIG. 10 is a rear perspective view of the tiller of FIG. 1.

FIG. 10 is a rear perspective view of the tiller 10 of FIG. 1. The hinge 80 that supports the back plate 30 comprises a long rod (not shown) that extends from the hub end support 69 to the gear end support 68. In this regard the hinge 80 is inserted through an opening (not shown) in a rear end of the hub end support 69 and extends through openings in the back plate 30 and then through an opening in the gear end support 68. The hinge 80 is secured in place by a cotter pin 89 that passes through an opening (not shown) on the hinge 80

FIG. 11 is an exploded view of the tiller 10 of FIG. 1. The gear end 2 connects to the gear end support 68, and the shaft cover 63 connects to the gear end 2. The hub end 3 connects to the hub end support 69.

The gearbox 47 connects to the gearbox mount 11. The gearbox mount 11 connects to the deck 65, which comprises openings 84 for receiving fasteners (not shown). A gearbox support plate 83 is installed on the underside (not shown) of the deck 65 to further support the gearbox. Openings 85 in the gearbox support plate 83 align with the openings 84 and receive fasteners (not shown) that affix the gearbox mount 11 to the deck 65.

The tine rotor 5 is removable from the tiller 10 as one piece. The end disc 51a connects to the gear end spindle 48 via fasteners 27. The tines 6 connect to the tine rotor 5 via a plurality of fasteners 8. In the illustrated embodiment, the tines 6 generally comprise flat pieces of metal that are curved or bent as shown. In this regard, the tines 6 curve alternately toward the hub end of the tiller 10 and the gear end of the tiller 10.

The back plate 30 fits within downwardly extending edges of the hub end support 69 and the gear end support 68. An opening 120 in the back plate 30 aligns with an opening 122 in the hub end support 69. The hinge 80 passes through the openings 122 and 120 and then through an opening 121 on the back plate and through an opening (not shown) on the gear end support and is then secured with the cotter pin 89 (FIG. 10).

FIG. 12 is an inner side perspective view of the gear end 2 according to an embodiment of the present disclosure. An inner side 94 of the gear end 2 faces the tine rotor 5 (FIG. 1) when the gear end 2 is installed on the tiller 10. The gear end spindle 48 is rotatably connected to the gear end 2, and translates rotation from the gearbox 47 (FIG. 1) to the tine rotor 5 as discussed above. The gear end spindle 48 comprises a plurality of openings 86 which align with the openings 58 (FIG. 5) on the end disc 51a (FIG. 5). Fasteners 27 (FIG. 1) releasably connect the gear end spindle 48 to the end disc 51a.

An opening 93 in the gear end 2 receives the shaft cover 63 (FIG. 1), which extends from the gearbox 47 (FIG. 1) and houses the gear shaft (not shown).

FIG. 13 is a side view of the gear end 2 of FIG. 12. The cover 72 is releasably affixed to an outer side 95 of the gear end 2. The cover 12 covers the gears (not shown) that translate rotation from the gearbox 47 (FIG. 1) to the tine rotor 5 (FIG. 1). A fixed sleeve 87 is affixed to the inner side 94 of the gear end 2. The fixed sleeve 87 is generally cylindrical in one embodiment and rotatably receives the gear end spindle 48, which rotates within the sleeve 87 when actuated by the gears (not shown).

FIG. 14 is a cross sectional view of the gear end 2 of FIG. 12, taken along section lines B-B of FIG. 12. An upper gear 96 is rigidly connected to the gear shaft (not shown) that extends from the gearbox 47 (FIG. 1) and is covered by the shaft cover 63 (not shown). In operation of the tiller 10, the gearbox 47 rotates the gear shaft which rotates the upper gear 96 around an upper gear axis 97. The rotation of the upper gear 96 causes rotation in a middle gear 91, which is adjacent to and interlocked with the upper gear 96. The middle gear 91 rotates around a middle gear axis 98, and this rotation causes rotation in a lower gear 90, which is adjacent to and interlocked with the middle gear 91. The lower gear rotates around a lower gear axis 99. The lower gear 90 is rigidly connected with and in the same axis of rotation with the gear end spindle 48. Therefore, the gear spindle 48 rotates when the lower gear rotates, and the gear spindle 48 in turn rotates the tine rotor 5 (FIG. 1). Therefore, the lower gear axis 99 is the same as the longitudinal axis 56 (FIG. 3) of the shaft 52 (FIG. 3).

Figure 15:
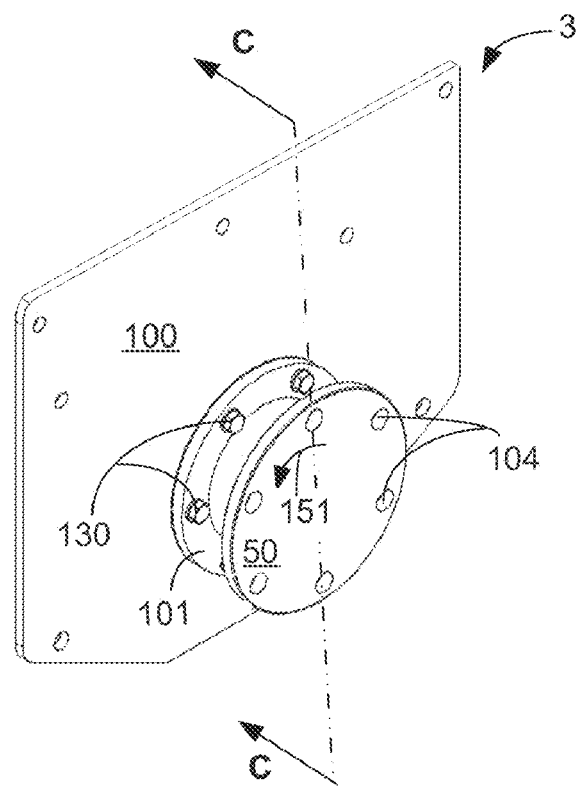
FIG. 15 is a side perspective view of a hub end of the tiller of FIG. 1.

FIG. 15 is an inside perspective view of the hub end 3 of the tiller 10 (FIG. 1) according to an embodiment of the present disclosure. An inner side 100 of the hub end 3 faces the tine rotor 5 (FIG. 1) when the hub end 3 is installed on the tiller 10. The hub end spindle 50 is rotatably connected to the hub end 3. In this regard, a hub end sleeve 101 is rigidly connected to the hub end 3 and rotatably receives the hub end spindle 50. The hub end spindle 50 thus rotates within the hub end sleeve 101 in the direction indicated by directional arrow 151 when the tine rotor 5 (FIG. 1) rotates.

The hub end spindle 50 comprises a plurality of openings 104 which align with the openings (not shown) on the end disc 51b (FIG. 1). Fasteners (not shown) releasably connect the hub end spindle 50 to the end disc 51b.

Figure 16:
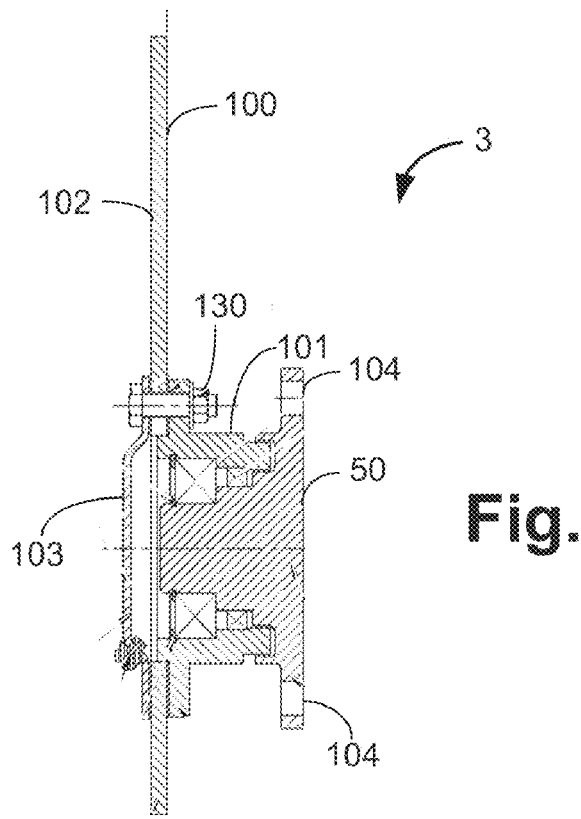
FIG. 16 is a cross-sectional view of the hub end of FIG. 15, taken along section lines C-C of FIG. 15.

FIG. 16 is a cross sectional view of the hub end 3 of FIG. 15, taken along section lines C-C of FIG. 15. The hub end spindle 50 is rotatably connected to the hub end sleeve 101. The hub end sleeve is rigidly affixed to the inner side 100 of the hub end 3 and rotatably receives the hub end spindle 50.

The hub end spindle 50 comprises a plurality of openings 104 which align with the openings (not shown) on the end disc 51b (FIG. 1). Fasteners (not shown) releasably connect the hub end spindle 50 to the end disc 51b. The hub end spindle 50 rotates when the tine rotor 56 (FIG. 3) rotates.

What is claimed is:

1. A tiller comprising:
 a top side comprising a gearbox for receiving and translating rotational movement from a tractor;
 a gear side disposed on one end of the top side and comprising gears for translating the rotational movement from the gearbox;
 a hub side on an opposed end of the top side, wherein the top side, gear side, and hub side define a cavity;

a first spindle rotatably connected to an inside surface of the gear side and extending within the cavity;

a second spindle rotatably connected to an inside surface of the hub side and extending within the cavity; and a rotatable tine rotor extending between the first spindle and the second spindle, the tine rotor comprising two end flanges releasably connected to the two spindles within the cavity.

2. The tiller of claim 1, wherein the gear side comprises a first end plate extending downwardly from the top side.

3. The tiller of claim 2, wherein the hub side comprises a second end plate extending downwardly from the top side.

4. The tiller of claim 1, wherein the tine rotor extends generally horizontally between the first spindle and the second spindle.

5. The tiller of claim 3, wherein the first end plate and the second end plate are generally parallel to each other, and are generally perpendicular to the top side.

6. The tiller of claim 1, wherein the first and second spindles comprise a plurality of openings for receiving fasteners.

7. The tiller of claim 1, wherein the end flanges comprise openings alignable with the openings of the first or second spindles, for releasable connection of the spindles to the end flanges.

8. The tiller of claim 3, further comprising a back plate rotatably connected to the tiller at a top edge of the back plate.

9. A tiller comprising:

a top plate, a first end plate extending downwardly from an end of the top plate, and a second end plate extending downwardly from an opposed end of the top plate, wherein the top plate and the first and second end plates form a cavity;

a tine rotor comprising a generally horizontal shaft disposed within the cavity, the shaft comprising two ends, wherein the two ends comprise a first end disc and a second end disc tine discs rigidly affixed to the shaft for receiving tines;

a gearbox for translating rotational motion received from a tractor;

a plurality of gears for translating the rotational motion from the gearbox to a gear end spindle extending into the cavity, wherein the gear end spindle releasably connects to the first end disc within the cavity.

10. The tiller of claim 9, wherein the second end plate comprises a rotatable hub end spindle extending into the cavity.

11. The tiller of claim 10, wherein the second end disc releasably connects to the rotatable hub end spindle within the cavity.

* * * * *